United States Patent [19]

Reed

[11] Patent Number: 5,030,177
[45] Date of Patent: Jul. 9, 1991

[54] HYDROMECHANICAL STEERING TRANSMISSION WITH IMPROVED HIGH RANGE SPEED PERFORMANCE

[75] Inventor: Bradley O. Reed, Pittsfield, Mass.

[73] Assignee: General Electric Company, Pittsfield, Mass.

[21] Appl. No.: 515,026

[22] Filed: Apr. 26, 1990

[51] Int. Cl.⁵ .................... F16H 47/04; F16H 47/00
[52] U.S. Cl. .......................................... 475/24; 475/21; 475/22; 475/23; 475/72; 475/73; 475/80
[58] Field of Search ................... 475/22, 23, 24, 72, 475/74, 75, 76, 80, 81, 83; 74/471 XY

[56] References Cited

U.S. PATENT DOCUMENTS

| | | | |
|---|---|---|---|
| Re. 27,307 | 3/1972 | DeLalio | 475/81 X |
| 3,199,376 | 8/1965 | DeLalio | 475/24 |
| 3,306,129 | 2/1967 | DeLalio | 475/81 X |
| 3,383,952 | 5/1968 | Christenson | 475/24 |
| 3,398,605 | 8/1968 | Ainsworth et al. | 475/80 |
| 3,461,744 | 8/1969 | Booth | 475/23 |
| 3,511,111 | 5/1970 | Eickmann | 475/76 |
| 3,709,061 | 1/1973 | Orshansky, Jr. | 475/80 |
| 3,748,924 | 7/1973 | Cross et al. | 475/75 |
| 3,763,718 | 10/1973 | Tipping | 475/82 |
| 3,842,694 | 10/1974 | Marlow | 74/867 |
| 3,855,879 | 12/1974 | DeLalio | 475/82 |
| 3,861,240 | 1/1975 | Nolan et al. | 475/81 |
| 4,076,090 | 2/1978 | Krusche et al. | 74/471 XY |
| 4,345,488 | 8/1982 | Reed | 475/24 |
| 4,373,408 | 2/1983 | Mills | 475/72 |
| 4,471,669 | 9/1984 | Seaberg | 475/24 |
| 4,505,168 | 3/1985 | Booth et al. | 475/23 |
| 4,848,186 | 7/1989 | Dorgan et al. | 475/24 |
| 4,882,947 | 11/1989 | Barnard | 475/23 |

*Primary Examiner*—Leslie A. Braun
*Assistant Examiner*—David E. Henn
*Attorney, Agent, or Firm*—Bailin L. Kuch; Robert A. Cahill

[57] ABSTRACT

To increase the top speed of a multi-speed range hydromechanical steering transmission for tracklaying vehicles, the displacements of the hydraulic motors in the two hydrostatic drive units are abruptly destroked from 100% displacement to 80% displacement at the moment the infinitely variable displacements of their respective hydraulic pumps achieve zero displacement during acceleration through the highest forward speed range of the transmission.

18 Claims, 2 Drawing Sheets

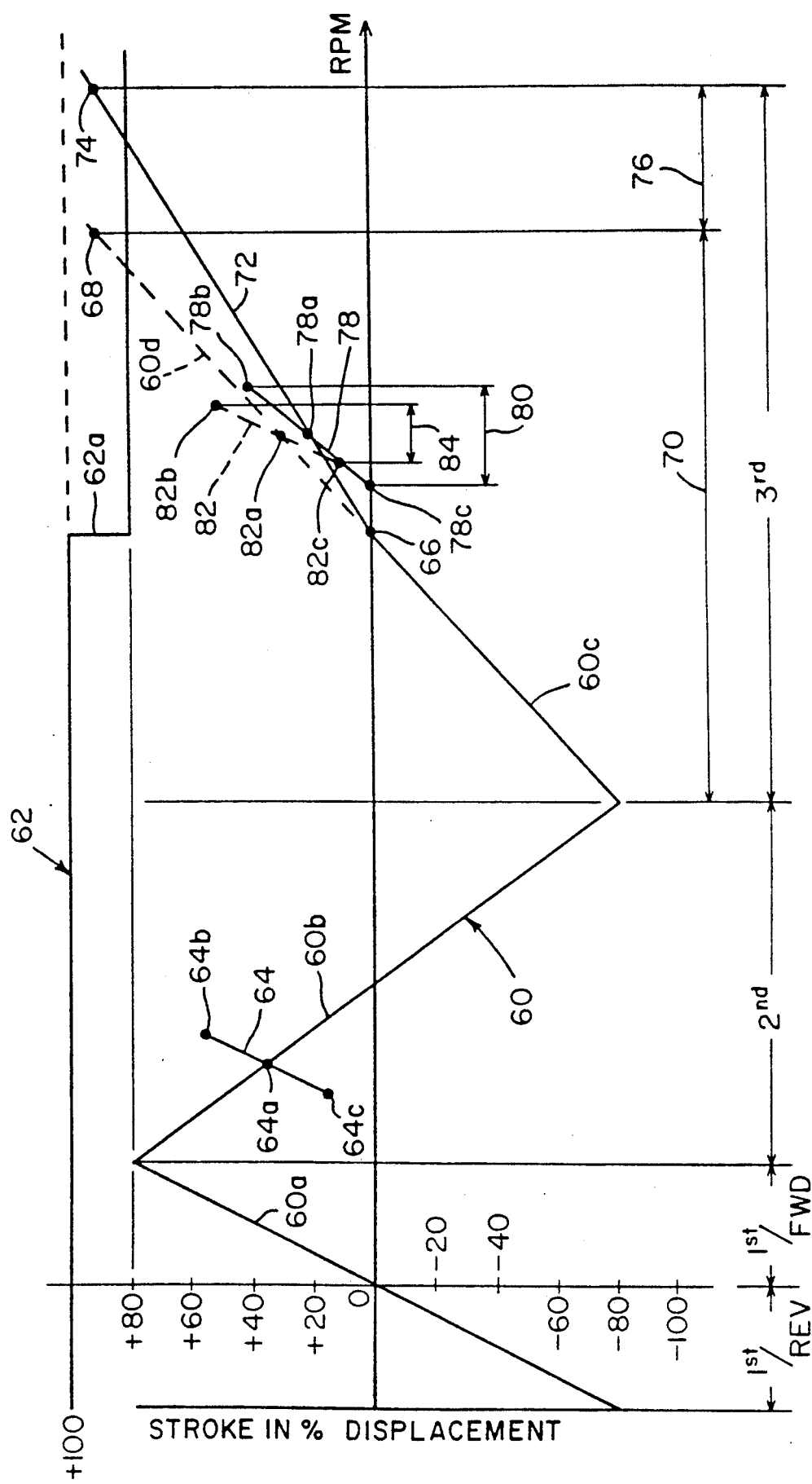

HYDROMECHANICAL STEERING TRANSMISSION WITH IMPROVED HIGH RANGE SPEED PERFORMANCE

The present invention relates to hydromechanical steering transmissions for tracklaying or skid-steered vehicles.

BACKGROUND OF THE INVENTION

Hydromechanical steering transmissions for tracklaying or skid-steered vehicles, such as military tanks, are typically comprised of a range-changing gear pack and right and left hydrostatic drive units, all commonly driven in parallel by the vehicle prime mover operating at a substantially constant speed. Each hydrostatic unit includes a hydraulic pump and a hydraulic motor interconnected in a hydraulic fluid loop circuit. The hydraulic pump is driven by the mechanical output of the prime mover, such as a diesel or gas turbine engine, and, in turn, fluidically drives its hydraulic motor to produce a hydrostatic output. The speed of this hydrostatic output is determined by the relative hydraulic fluid displacements of the interconnected pump and motor. While it has been proposed that hydrostatic output speed can be varied by varying the displacements of both the pump and motor, in practice only the displacement of the pump is varied, while the motor is held at a constant, typically maximum displacement for optimum torque.

In hydromechanical steering transmissions of the type disclosed in Applicant's U.S. Pat. No. 4,345,488, the hydrostatic outputs of the two hydrostatic drive units are combined to produce a speed-averaged hydrostatic output which is applied as a second input to the range-changing gear pack along with the prime mover mechanical output. The range-changing gear pack thus produces a hydromechanical output which is combined with the hydrostatic output of the left hydrostatic unit in a left combining gear set and with the hydrostatic output of the right hydrostatic unit in a right combining gear set. The hydromechanical outputs of the left and right combining gear sets are produced on left and right transmission shafts, respectively, to drive the two vehicle tracks.

The range-changing gear pack is equipped with a plurality of brakes and clutches for selectively grounding and engaging gear elements thereof to incrementally change its input to output speed ratio and thus, to establish a plurality of forward speed ranges and at least one reverse speed range. Since the hydrostatic outputs are superimposed on the hydromechanical output of the range-changing gear pack by the combining gear sets, speed variation in each speed range is achieved by varying the hydrostatic output speeds, i.e., by varying the hydraulic pump displacements. This practice is commonly referred to as varying the "stroke" or "stroking" the hydraulic pumps. Since a hydraulic pump can be designed such that its displacement can be infinitely varied from 100% to zero displacement, hydrostatic output speed can be likewise infinitely varied between a maximum value and zero in either direction. Consequently the hydromechanical outputs of the transmission are capable of infinitely variable speeds within the limits of each speed range.

It will be appreciated that, when the hydraulic pumps of the left and right hydrostatic units are set at equal displacements or strokes the speeds of the left and right hydromechanical outputs of the transmission are equal, and straightline vehicle propulsion in the particular speed range established by the range-changing gear pack is produced. Uniform stroking of the two hydraulic pumps produces straightline acceleration or deceleration, depending upon stroking direction, of the vehicle. To steer the vehicle, the typical procedure is to uniformly stroke the two pumps in opposite directions, such that one transmission hydromechanical output is increased in speed to the same extent that the other transmission hydromechanical output is decreased in speed. The resulting speed differential imposed on the left and right tracks causes the vehicle to execute a steering maneuver.

Unfortunately, hydromechanical steering transmissions of this type are rather limited as to the top vehicle speed obtainable in the highest forward speed range. Certainly, the range-changing mechanism can be supplemented with a high, overdrive speed range, however this adds complexity, bulk and expense to the gear pack. In non-steering or so called "straight through" hydromechanical transmissions having one hydrostatic unit and one transmission output, it is common practice to stroke both the hydraulic pump and the hydraulic motor to extend the highest speed range and thus to increase top vehicle speed. However, in hydromechanical steering transmissions, wherein two hydrostatic units are jointly involved in both straightline and steer propulsion, hydraulic motor stroking of the hydraulic motors to increase top speed has not been implemented, primarily due to the potential adverse effects on output torque, steering performance, and the added complexities involved in the steering linkages and controls.

It is accordingly an object of the present invention to provide an improved hydromechanical steering transmission for tracklaying or skid-steered vehicles.

A further object is to provide a hydromechanical steering transmission of the above-character having improved maximum speed performance.

An additional object is to provide a method for controlling a hydromechanical steering transmission such as to achieve an extended top speed range and thus a higher vehicle top speed.

Another object is to provide a hydromechanical steering transmission of the above character, wherein a high top speed is achieved without prejudicing high speed steering performance.

Yet another object is to provide a hydromechanical steering transmission of the above-character, which is efficient in construction, convenient and simple to implement and control, and reliable in operation.

Other objects of the invention will in part be obvious and in part appear hereinafter.

SUMMARY OF THE INVENTION

In accordance with the present invention, there is provided an improved hydromechanical steering transmission and method of controlling same to propel a tracklaying or skid-steered vehicle to a higher top speed than has heretofore been achievable. To this end, the transmission includes a pair of identical hydrostatic drive units which are controlled to achieve infinitely variable speed straightline and steering vehicle propulsion in a plurality of forward speed ranges and at least one reverse speed range as established by a range-changing gear pack. Each hydrostatic unit includes a hydraulic pump and a hydraulic motor interconnected in closed loop hydraulic fluid flow relation. The hydraulic pumps are commonly driven with the range-changing gear pack by the typically constant speed mechanical output of the vehicle engine and, in turn, fluid-drive their hydraulic motors to produce respective hydrostatic outputs. The hydrostatic outputs are combined to produce a speed-average hydrostatic output which is applied to the range-changing gear pack to, in turn, produce a hydromechanical output. The hydrostatic outputs are also respectively combined in left and right combining gear sets with the hydromechanical output of the range-changing gear pack to produce separate transmission hydromechanical outputs driving the left and right vehicle tracks.

To produce speed variation in each of the speed ranges established by the range-changing gear pack, the displacements of the pumps are varied by a stroke controller between relatively positive and negative displacement limits through a mid-range point of zero displacement. The rate at which hydraulic fluid is pumped through the motors thus varies from a maximum in one direction of flow at the positive displacement limit to maximum flow in the opposite at the negative displacement limit. The motor hydrostatic output speeds correspondingly vary from a maximum in one direction to a maximum in the opposite direction through a mid-range point of zero velocity. Speed variation for straightline vehicle propulsion is achieved by uniformly varying the pump displacements in the same direction, while vehicle steer is achieved by uniformly varying the pump displacements in equal and opposite directions.

To achieve an increased top speed in accordance with the present invention, the stroke controller for varying the pump displacements, as generally described above, is additionally adapted to uniformly change the motor displacements in a stepped manner to extend the upper limit of the high speed range of the range-changing gear pack without detriment to high speed steering performance specifically and high speed range vehicle performance generally. More specifically, the stroke controller additionally operates to abruptly reduce (destroke) the motor displacements an incremental amount from a maximum, e.g. 100% displacement, to a lesser displacement, e.g. approximately 80%, at the mid-range point of the high speed range when hydrostatic output speed is zero. Consequently, motor destroke at this moment does not affect vehicle speed, and acceleration and steer in the upper half of the high speed range is effected solely by stroking the hydraulic pumps.

The invention accordingly comprises the features of construction, combination of elements, arrangement of parts, and method steps, all as detailed below, and the scope of the invention will be indicated in the claims.

BRIEF DESCRIPTION OF THE DRAWINGS

For a full understanding of the nature and objects of the invention, reference may be had to the following Detailed Description taken in conjunction with the accompanying drawings, in which:

FIG. 2 is a stroking diagram illustrating the manner of controlling the hydromechanical steering transmission in accordance with the method of the present invention.

DETAILED DESCRIPTION OF THE INVENTION

Figure 1:
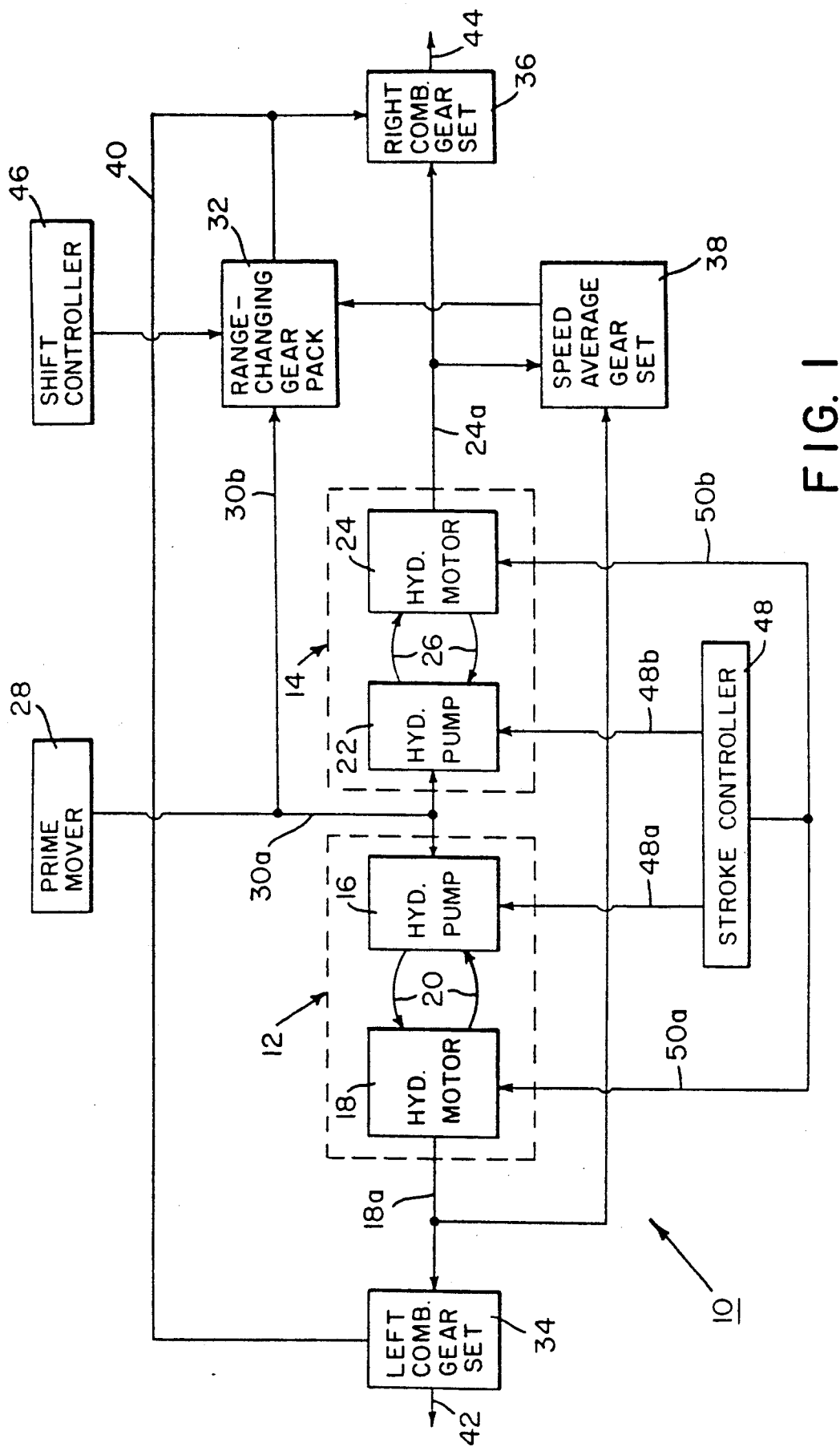
FIG. 1 is a block diagram of a hydromechanical steering transmission constructed in accordance with the present invention.

The hydromechanical steering transmission of the present invention, generally indicated at 10 in FIG. 1, includes a pair of identical hydrostatic drive units, generally indicated at 12 and 14. Hydrostatic unit 12 includes a hydraulic pump 16 and a hydraulic motor 18 interconnected in closed loop hydraulic fluid flow communication, as indicated by connections 20. Similarly, hydrostatic unit 14 includes a hydraulic pump 22 and a hydraulic motor 24 in hydraulic fluid flow intercommunication, as indicated by connections 26. These hydrostatic units may be constructed to utilize hydraulic pumps and motors of the ball-piston type disclosed in Applicants' U.S. Pat. No. 3,815,698 entitled "Hydromechanical Steering Transmission".

Hydraulic pumps 16 and 22 are driven at the same uniform speed by the mechanical output of a prime mover or engine 28 of a tracklaying vehicle via a power train 30a, as is a range-changing gear pack 32 via a power train 30b. This range-changing gear pack may be of the construction disclosed in Applicants' U.S. Pat. No. 4,345,488 entitled "Hydromechanical Steering Transmission". The engine mechanical output typically runs substantially at a constant speed. The hydrostatic output of hydraulic motor 18 on its shaft 18a is applied to a left combining gear set 34, and the hydrostatic output of hydraulic motor 24 on its shaft 24a is applied to a right combining gear set 36. These hydrostatic outputs are also applied to a speed average gear set 38 to produce a hydrostatic input to the range changing gear pack whose speed is the average of the hydrostatic output speeds of motors 18 and 24. In response to this speed average hydrostatic input and the mechanical input of the prime mover, gear pack 32 produces a hydromechanical output which is applied to combining gear set 36 and also to combining gear set 34 via a crossshaft 40. These combining gear sets may be planetary gear sets as disclosed in Applicants' above-cited patents to produce hydromechanical outputs on left and right transmission output shafts 42 and 44, respectively. The speed average gear set may be a double pinion planetary gear set as also disclosed in U.S. Pat. No. 4,345,488.

Range-changing gear pack 32, such as also disclosed in cited U.S. Pat. No. 4,345,488, for example, includes a plurality of brakes and a clutch which are selectively activated and engaged to change gear ratios and thus the speed of the hydromechanical output applied to combining gear sets 34, 36. This action, controlled by a shift controller 46, shifts the transmission through its various forward and reverse speed ranges. As is conventional practice, speed variation of the transmission hydromechanical outputs on shafts 42, 44 for straightline propulsion and steer in each speed range is controlled by a stroke controller 48 to vary the fluid displacements of the hydraulic pumps via linkages 48a and 48b automatically in response to vehicle operator speed and steer control inputs. Conventional practice also says that the fluid displacements of the hydraulic motors are continuously maintained at a fixed value, typically at 100% displacement. In accordance with the present invention, the displacements of the hydraulic motors are varied by stroke controller 48 via linkages 50a and 50b to achieve hydromechanical outputs on transmission shafts 42, 44 of a higher top speed.

To describe the operation of the stroke controller to achieve this objective, reference is made to FIG. 2 illustrating a stroking pattern typical for hydromechanical steering transmissions of the type generally described above, wherein transmission hydromechanical output speed in RPM versus stroke of the hydraulic pumps and motors in percent displacement is plotted. Specifically the curve generally indicated at 60 represents the stroking pattern of hydraulic pumps 16 and 22, while curve 62 represents the stroking pattern of hydraulic motors 18 and 24 as transmission 10 is operated through an illustrated three forward speed ranges and a single reverse speed range. It will be appreciated that the present invention is applicable to transmissions having more than three forward speed ranges as established by range-changing gear pack 32.

Typically, and as illustrated in FIG. 2, first range (1st) is strictly a hydrostatic speed range, wherein straightline and steer propulsion is developed solely by hydrostatic drive units 12 and 14. In other words, the gear pack hydromechanical output on cross-shaft 40 is zero, i.e., this cross-shaft is effectively grounded by an engaged brake (not shown). Thus, while a negative stroke is established in each of the hydraulic pumps by the stroke controller, the output shafts of their respective hydraulic motors are driven in reverse directions to propel the tracklaying vehicle in reverse (REV) as illustrated in FIG. 2. On the other hand, while the hydraulic pumps are in positive stroke, their hydraulic motor output shafts are driven in forward directions to propel the vehicle in a forward (FWD) direction. Portion 60a of curve 60 in FIG. 2 illustrates that to accelerate the vehicle from standstill forwardly in first range the hydraulic pumps are jointly stroked upwardly by the stroke controller from zero stroke (zero displacement) to a maximum positive stroke, which is typically set at +80% of maximum displacement as illustrated. This leaves 20% displacement available for steer propulsion near the upper end of the first forward speed range (1st/FWD).

To execute a steer maneuver in the first forward speed range, the stroke controller increases the positive stroke of one hydraulic pump and decreases the positive stroke of the other hydraulic pump by equal amounts. Stated another way, the stroke of one hydraulic pump is changed in the positive stroke direction by the same amount that the stroke of the other hydraulic pump is changed in the negative stroke direction. This is seen to change the right and left hydrostatic output speeds by equal and opposite amounts and thus propel the vehicle through a steer maneuver. Depending upon where the operating point in the first forward speed range is located when a steer is commanded by the vehicle operator, the left and right vehicle tracks may be driven in opposite directions. The same circumstances occur when a steer maneuver is performed in the first reverse speed range (1st/REV).

Portion 60b of curve 60 illustrates straightline vehicle propulsion in the second speed range (2nd), which is a hydromechanical speed range since range-changing gear pack 32 is now conditioned by shift controller 46 to produce a hydromechanical output on cross-shaft 40, and this hydromechanical output is combined with the hydrostatic outputs of the hydraulic motors by the combining gear sets 34 and 36. It is seen that second range acceleration is achieved by jointly varying the strokes of the hydraulic pumps from 80% positive stroke to 80% negative stroke. Again, 20% pump displacement is left available to perform a steer maneuver at or near the lower and upper limits of the second speed range.

Curve 64 represents a second range steer maneuver initiated at an operating point 64a on curve 60 at +35% stroke, wherein the stroke of one hydraulic pump is increased 20% to point 64b (+55% stroke) and the stroke of the other hydraulic pump is decreased 20% to point 64c (+15% stroke). Since steer propulsion is strictly hydrostatic, it is seen that the slope of straightline curve 64 is the same as that of straightline curve portion 60a. It will be appreciated that, by virtue of speed average gear set 38, the speed average hydrostatic input to the ranging-changing gear pack does not change speed in response to a steer maneuver in any of the speed ranges.

Curve 62 indicates that the displacements of the hydraulic motors remain fixed at +100% stroke throughout first range forward and reverse (1st REV and 1st FWD) and second range (2nd).

Curve portion 60c of curve 60 illustrates straightline vehicle propulsion in the lower half of the third speed range (3rd) established in the range-changing gear pack by the shift controller. It is seen that the hydraulic pumps are both at −80% stroke at the lower limit of third range to produce maximum hydrostatic output speed in the reverse direction. Acceleration through third range is then produced by gradually stroking the hydraulic pumps upwardly (decreasing the negative stroke). This progressively decreases the negative directional speed of the motor hydrostatic outputs until, at point 66, their output speeds reach zero velocity. If nothing else is done except to continue stroking the pumps upwardly from point 66 to point 68 of maximum positive stroke (typically +90% or more to slightly increase vehicle top speed in the highest speed range) and thus to progressively increase hydrostatic output speed from zero in the forward direction, then the upper half of third range operation is illustrated by dashed line 60d which is seen to be a straightline extension of curve portion 60c continuing to the upper limit (point 68) of third range. The range of vehicle speeds covered by third range under these conditions is indicated by double pointed arrow 70.

In accordance with the present invention, the hydraulic motors are abruptly destroked by stroke controller 48 from +100% displacement to +80% displacement, as indicated by the vertical line segment 62a of curve 62, when straightline acceleration through the first half of third range along curve portion 60c reaches point 66 where hydrostatic output speed is zero. As a consequence, acceleration through the upper half of third range now follows solid line curve portion 72, which is of a lesser positive slope than dash line curve portion 60d. It will be appreciated that the relationship of speed and displacement for the hydraulic pump and motor of a hydrostatic unit (ignoring slip leakage) can be expressed as follows:

$$RPM_{pump} \times displacement_{pump} = RPM_{motor} \times displacement_{motor}$$

From this equation, it is seen that, for a pump driven at a constant speed and a given displacement, a reduction in motor displacement produces an increase in motor hydrostatic output speed. Thus, the upper limit of third range is extended out to point 74, thereby achieving expanded speed coverage, as indicated by the double pointed arrow 3rd. For example, when the hydraulic motors are destroked from +100% to +80% as in the illustrated embodiment, a twenty five percent increase in hydraulic motor speed and approximately a seven percent increase in top vehicle speed, indicated by arrow 76, is achieved. Moreover, by destroking the hydraulic motors when their hydrostatic outputs are zero (point 66), there is no effect on vehicle speed or transmission ratio at the moment of destroke.

It will be understood that during deceleration through the upper half of the third speed range, the stroke controller strokes the hydraulic motors back to +100% displacement upon downward passage through point 66.

To illustrate steering operation in the upper half of the third speed range with the hydraulic motor downstroked or destroked to +80% displacement, curve 78 represents a steer maneuver initiated at operating point 78a on curve portion 72. The displacement of one hydraulic pump is increased from +20% stroke (point 78a) to +40% stroke (point 78b), while the displacement of the other hydraulic pump is decreased to zero stroke (point 78c). The speed differential of the hydraulic motor hydrostatic outputs is indicated by double pointed arrow 80. Without motor destroking, a steering maneuver initiated at the same vehicle speed in the upper half of third range is represented by curve 82 which is seen to be of the same slope as curve 64. The displacement of one pump is increased from +30% stroke at operating point 82a, vertically aligned with operating point 78a, to +50% stroke (point 82b), and the displacement of the other pump is reduced to +10% stroke (point 82c). The speed differential of the hydraulic motor hydrostatic outputs is indicated by double pointed arrow 84. While speed differential 80 is slightly greater than speed differential 84 due to the lesser positive slope of curve 78, there is no discernible effect on steer performance or on the ability of the vehicle operator to positively control a high speed steer maneuver.

It will be appreciated that steer maneuvers executed near the third range midpoint 66 may result in one hydraulic pump being stroked through zero displacement. However, the stroke of the hydraulic motor associated with that pump is not changed. The strokes of the hydraulic motors are preferably always incrementally changed concurrently and only when either both hydraulic pumps achieve essentially zero displacement during straightline propulsion through the third range midpoint or the average of the pump displacements is essentially zero as will occur while accelerating or decelerating through a steer near the third range midpoint. In the latter case, incremental hydraulic motor stroking in accordance with the present invention has been found to have no noticeable effect on steer characteristics or performance.

While the foregoing description has disclosed a 20% motor destroke increment, i.e., from +100% to +80% displacement, as being successful in achieving the objectives of the present invention, it should be understood that the motor destroke increment may be of a lesser or greater magnitude. However destroke increments significantly greater than 20% displacement may have adverse effects on torque and steer performance. Moreover, incremental motor destroke could be effected at the mid-range point of the second range, when hydrostatic output is also zero, to extend both second and third range top speed. Alternatively, incremental motor destroke could be effected in stages, e.g., a 10% destroke at the mid-range point of second range and a 10% destroke at the mid-range point of third range. However, the most straight forward approach to implementing the present, in terms of simplicity and effectiveness, is to effect a single motor destroke increment at the mid-range point of the highest speed range of the hydromechanical steering transmission, which, in the illustrated embodiment is third range.

From the foregoing description, it is seen that the present invention provides an improved hydromechanical steering transmission for tracklaying vehicles and a method for controlling same to achieve a beneficial increase in top speed. This objective is achieved without noticeably or adversely effecting steer performance which remains smooth, uninterrupted and predictable even during a motor destroke transition. Since a steer maneuver is effected solely by differentially stroking the hydraulic pumps regardless of whether or not the hydraulic motors are destroked, steering linkages 48a, 48b can be of a straightforward design. The only changes to an existing hydromechanical steering transmission necessary to implement the present invention are in the hydraulic motors to render their displacements incrementally adjustable, in the stroke controller to effect these incremental displacement changes at the requisite point in the pump stroking pattern, and the addition of linkages 50a, 50b which may be mechanical, hydraulic or electrical in nature.

It is thus seen that the objects set forth above, including those made apparent from the preceding Detailed Description, are efficiently attained, and, since certain changes in the embodiment set forth may be made without departing from the scope of the invention, it is intended that matters of detail be taken as illustrative and not in a limiting sense.

Having described the invention, what is claimed as new and desired to secure by Letter Patent is:

1. A hydromechanical steering transmission for tracklaying vehicles having an engine, said transmission comprising, in combination:

A. a first hydrostatic unit including a first variable displacement hydraulic pump and a first variable displacement hydraulic motor interconnected in hydraulic loop circuit, said first hydraulic pump driven by said engine thereby causing said first hydraulic motor to produce a first hydrostatic output;

B. a second hydrostatic unit including a second variable displacement hydraulic pump and a second variable displacement hydraulic motor interconnected in hydraulic loop circuit, said second hydraulic pump driven by said engine thereby causing said second hydraulic motor to produce a second hydrostatic output;

C. a range-changing gear pack driven by said engine to produce a gear pack output;

D. a left combining gear set for combining said gear pack output and said first hydrostatic output to produce a first hydromechanical output on a left output shaft of said transmission;

E. a right combining gear set for combining said gear pack output and said second hydrostatic output to produce a second hydromechanical output on a right output shaft of said transmission;

F. a shift controller for shifting said range-changing gear pack between a plurality of speed ranges of incrementally different ratios of input to output speeds; and G. a stroke controller linked to said first and second hydraulic pumps for commonly varying said displacements thereof to vary the speeds of said first and second hydrostatic outputs for infinitely variable speed straightline propulsion in each of said speed ranges and for differentially varying said displacements thereof to differentially vary the speeds of said first and second hydrostatic outputs for steering propulsion in each of said speed ranges, said stroke controller being further linked to said first and second hydraulic motors for changing said displacements in a stepped manner between first and second values during straightline acceleration and deceleration of said vehicle in at least one of said speed ranges when said displacements of said first and second hydraulic pumps achieve a third value, whereby to increase the top speed of said first and second hydromechanical outputs.

2. The hydromechanical steering transmission defined in claim 1, wherein said first displacement value is 100%.

3. The hydromechanical steering transmission defined in claim 2, wherein said third displacement value is zero.

4. The hydromechanical steering transmission defined in claim 3, wherein said second displacement value is on the order of 80%.

5. The hydromechanical steering transmission defined in claim 4, wherein said one speed range is the highest forward speed range of said range-changing gear pack.

6. The hydromechanical steering transmission defined in claim 5, which further includes a speed average gear set driven by said first and second hydrostatic outputs for producing a hydrostatic input to said range-changing gear pack of speed equal to the average speeds of said first and second hydrostatic outputs.

7. The hydromechanical steering transmission defined in claim 1, wherein said third displacement value is the average of said first and second hydraulic pump displacements and is equal to zero.

8. The hydromechanical steering transmission defined in claim 7, wherein said first displacement value is 100%.

9. The hydromechanical steering transmission defined in claim 8, wherein said second displacement value is on the order of 80%.

10. In a hydromechanical steering transmission having a mechanical input commonly driving a range-changing gear pack and first and second hydrostatic units, each said hydrostatic unit including a hydraulic pump and a hydraulic motor interconnected in hydraulic loop circuit, a left combining gear set for combining a first hydrostatic output of said first hydrostatic unit and an output of said range-changing gear pack to produce a first hydromechanical output on a left output shaft of the transmission, a right combining gear set for combining a second hydrostatic output of said second hydrostatic unit and said output of said range-changing gear pack to produce a second hydromechanical output on a right output shaft of the transmission, a shift controller for shifting said range-changing gear pack from speed range to speed range, and a stroke controller for commonly varying the displacements of said first and second hydrostatic unit pumps to infinitely vary the speeds of said first and second hydrostatic outputs for infinitely variable speed straightline propulsion in each of said speed ranges and for differentially varying the displacements of said first and second hydrostatic unit pumps to differentially vary the speeds of said first and second hydrostatic outputs for steering propulsion in each of said speed ranges, a method for increasing the top speed of said first and second hydromechanical outputs comprising the steps of:

A. changing the displacement of said first hydrostatic unit motor in a stepped manner between first and second displacement values when the displacement of said first hydrostatic unit pump achieves a third displacement value during straightline propulsion in at least one of said speed ranges; and B. changing the displacement of said second hydrostatic unit motor in a stepped manner between fourth and fifth displacement values when the displacement of said second hydrostatic unit pump achieves a sixth displacement value during straightline propulsion in said one speed range.

11. The method of claim 10, wherein said first and fourth displacement values are equal, said second and fifth displacement values are equal, and said third and sixth displacement values are equal.

12. The method of claim 11, wherein said third and sixth displacement values are essentially zero.

13. The method of claim 12, wherein said first and fourth displacement values are essentially 100%.

14. The method of claim 13, wherein said second and fifth displacement values are on the order of 80%.

15. The method of claim 14, wherein said one speed range is the highest forward speed range of said range-changing gear pack.

16. The method defined in claim 10, wherein the displacements of said first and second hydrostatic unit motors are concurrently changed between said first and second displacement values and said fourth and fifth displacement values, respectively, when the average of said third and sixth displacement values is essentially zero during straightline and steer propulsion in said one speed range.

17. The method defined in claim 16, wherein said first and fourth displacement values are essentially 100%.

18. The method defined in claim 17, wherein said second and fifth displacement values are on the order of 80%.

* * * * *